May 28, 1968   J. B. SHERRILL   3,385,325
JACKEYE AND CONNECTOR ASSEMBLY
Filed July 22, 1966
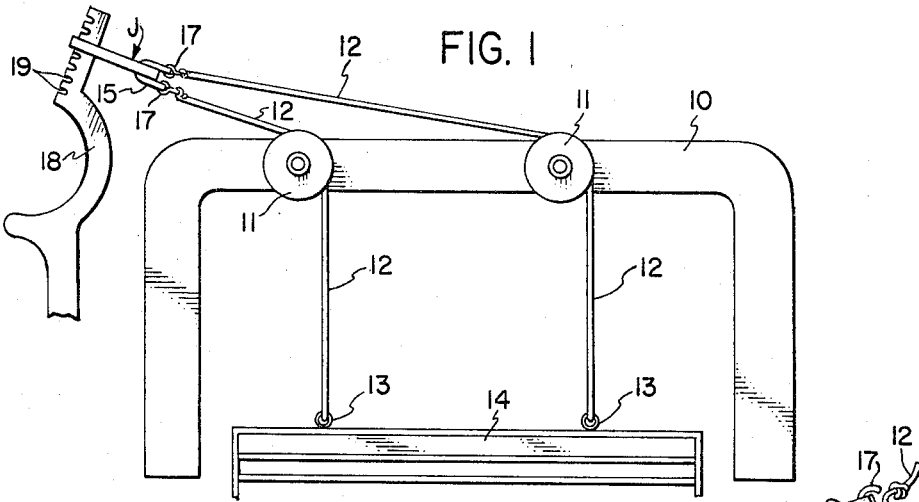
FIG. 1
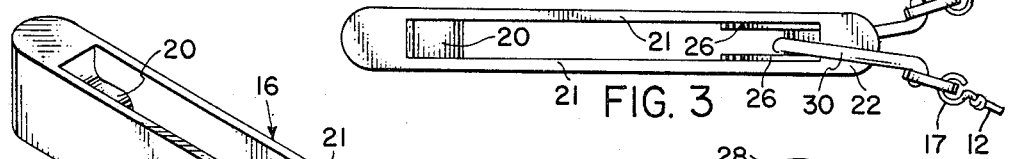
FIG. 2
FIG. 3
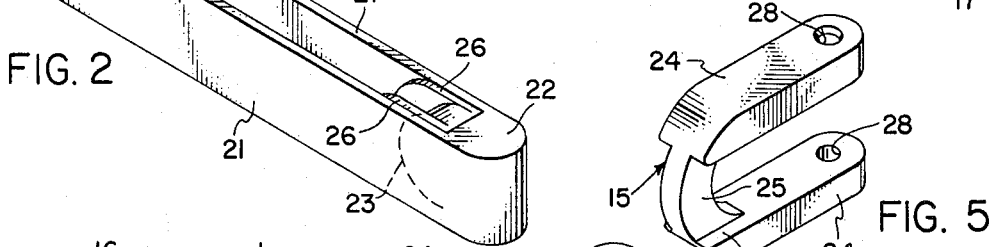
FIG. 4
FIG. 5
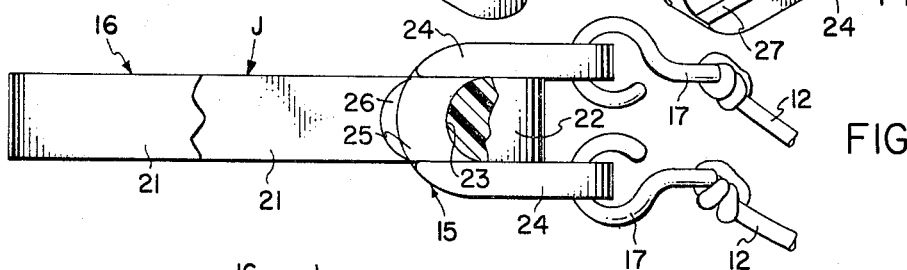
FIG. 7
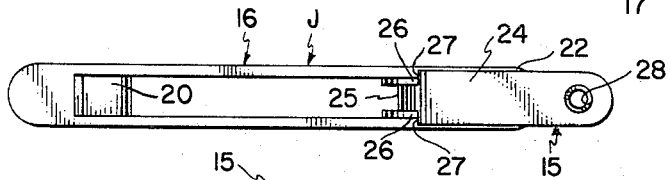
FIG. 6
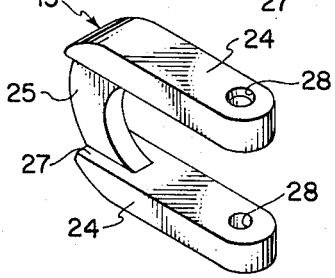
INVENTOR
JOHN B. SHERRILL
BY *Clifton T. Hunt, Jr.*
ATTORNEY

United States Patent Office 3,385,325
Patented May 28, 1968

3,385,325
JACKEYE AND CONNECTOR ASSEMBLY
John B. Sherrill, Drawer 578, Gastonia, N.C. 28052
Filed July 22, 1966, Ser. No. 567,280
7 Claims. (Cl. 139—84)

ABSTRACT OF THE DISCLOSURE

A harness connector for use with a loom jackeye having a neck portion and shoulders for preventing relative movement between the jackeye and the connector and a pair of legs for connecting a harness frame.

---

In many looms the warp-controlling harness frames are raised and lowered by a mechanism including jack levers, the movements of which are controlled by a pattern chain. Each jack lever has notches in one edge to receive one end of a jackeye, the other end of the jackeye being conventionally attached to one or more harness frame connectors.

Jackeyes have been historically made from metal, but plastic has been increasingly used in recent years in the manufacture of jackeyes. One advantage of plastic over the use of metal in making jackeyes is that the plastic has a greater capacity for shock absorption than metal, and this characteristic takes on increasing importance with the current emphasis on high speed looms. Nylon has proven particularly satisfactory in providing the requisite flexibility to absorb the shock from the jack lever in today's high speed looms, but one difficulty in the use of nylon for jackeyes is that it is subject to wear through the relative movement occasioned between the jackeye and the leader wires or harness cords connected to the end of the jackeye opposite the jack lever.

By means of the present invention, the advantages of the inherent resiliency and flexibility of the nylon may be retained to advantageously absorb the shock of the jack lever, while at the same time providing a connector between the jackeye and the harness cords which will protect the jackeye, whether made from nylon or other material, from frictional wear. According to the invention, the connector may be releasably connected to the jackeye and seated against movement relative to the jackeye for operative connection to the harness cords or to a leader wire, as desired.

The ease with which the connector of the present invention may be connected and removed from the jackeye advantageously increases the flexibility of use of the jackeye. Thus, the connector may be removed from the jackeye so that the jackeye may be connected to leader wires in a conventional manner in the event such a connection is deemed desirable. The connector may be easily and quickly assembled with the jackeye and locked against relative movement whenever it is desired to protect the jackeye against wear occasioned by relative movement between the jackeye and the connecting cords or leader wire.

The connector is so designed that it enables the use of one leader wire or no leader wire. The harness cords may be hooked directly to the connector, thereby eliminating the need for a leader wire. It has been possible in certain prior art devices, such as that shown in Patent No. 2,591,397 issued April 1, 1952, upon application of William A. Blanchard to connect the harness cords directly to the jackeye without the use of a leader wire, but in all such prior devices of which applicant is aware, including the aforesaid patent, no means were provided for selectively removing the connector from the jackeye.

The connector is preferably made from a relatively wear-resistant material, and is somewhat harder than the nylon jackeye. Connectors made from Delrin have been found satisfactory in actual practice and to adequately withstand wear. Of course, in the event of excessive wear or loss of either the connector or jackeye it may be readily replaced without replacing the other component.

The present invention is designed to allow accurate control of the harness frame which is operated by the dobby jack while at the same time reducing wear at the connection of the leader wires or dobby cords with the jackeye.

It is, therefore, an object of the present invention to provide an improved jackeye and removable connector, which, due to its improved design, may be readily assembled and locked against relative movement to protect the jackeye against wear which would otherwise occur because of relative movement between the leader wires or the dobby cords and the jackeye.

Another object of the present invention is to provide a jackeye and connector assembly which may be used as a conventional jackeye but which is adapted to be locked together so that the jackeye and relatively wear-resistant connector function as a unitary structure.

A further object of the present invention is to provide an improved jackeye of flexible shock-resistant material which is adapted to accommodate a relatively wear-resistant connector but which retains its capacity, upon removal of the connector, for conventional use of the jackeye.

Other objects and advantages of the present invention will become apparent and obvious from a study of the following description and the accompanying drawings which are merely illustrative of the present invention.

In the drawings:

FIGURE 1 is a diagrammatic side elevation of the upper part of a loom showing the improved jackeye and connector assembly in operative position with the dobby jack;

FIGURE 2 is a perspective view of the jackeye component of the improved assembly removed from the connector;

FIGURE 3 is a top view of such jackeye and illustrating how it may be used with conventional leader wires without the connector;

FIGURE 4 is a side elevation with parts broken away, of the assembled jackeye and connector;

FIGURE 5 is a perspective view of the connector component of the assembly removed from the jackeye;

FIGURE 6 is a view similar to FIGURE 5, but looking in the opposite direction; and FIGURE 7 is a top plan view of the jackeye and connector assembly.

With further reference to the drawings, FIGURE 1 discloses a loom frame 10 having sheaves 11 rotatably mounted thereon. A pair of dobby cords 12 are connected by way of eyelets 13 to harness frame 14. The opposite ends of the dobby cords 12 are connected to a connector member 15 of a jackeye and connector assembly J as by hooks 17. A conventional dobby jack 18 is provided having notches 19 along one edge thereof to engage tooth 20 of a jackeye 16 in pre-adjusted operative relationship.

The jackeye 16 is preferably formed from a flexible shock absorbing material such as nylon and has side walls 21 which extend on either side of and beyond the tooth 20 to form a slot or opening which loosely receives the dobby jack 18. The end of the jackeye opposite the tooth 20 is closed by an end wall 22 which joins with the side walls 21 to enclose the opening or slot. The surface of the end wall 22 which extends into the slot between the side walls 21 is uniformly curved or rounded as is indicated at 23. Such an arcuate configuration provides an effective base or seat for leader wires 30 which may be passed through the jackeye in a conventional manner as shown in FIGURE 3. The leader wires 30 are in turn suitably connected to the dobby cords 12.

The arcuate or curved inner surface 23 of the end wall 22 also provides a seat for the removable connector 15. The connector 15 is preferably formed from a relatively rigid and wear-resistant material as compared with the jackeye 16. The connector 15 is of generally U-shaped configuration comprising a pair of spaced parallel legs 24 joined together adjacent corresponding ends by a reduced neck or web 25.

The side walls 21 are effectively thickened adjacent the arcuate seat 23 by a pair of inwardly protruding shoulders 26 which define a relatively narrow space therebetween as compared with the dimension of the opening or slot between the main parts of the side walls 21.

When the jackeye 16 and connector 15 are assembled into the position shown in FIGURES 1, 4 and 7, the narrow neck 25 is snugly received between the shoulders 26 and its inner arcuate surface closely conforms to the curvature of the seat 23. The junctures of the neck 25 with the legs 24 on the connector 15 define shoulders 27 (FIGURES 5 and 6) which extend over the side walls 21 as most clearly seen in FIGURE 7.

The interlocking relationship of the connector 15 and jackeye 16 in the manner described and illustrated effectively prevents relative movement between these two components of the assembly during operation of the loom. Each of the legs 24 of the connector 15 has a bore 28 to which the hooks 17 on the dobby cords 12 may be connected. If desired, the connector 15 may be removed from association with the jackeye 16 by sliding the connector 15 within the opening between the side walls 21 and past the shoulders 26, after which the connector 15 may be manipulated to remove it from the jackeye. In use, the force exerted against the connector 15 by the harness cords 12 serves to keep the connector 15 properly seated against the arcuate inner surface 23 of the end wall 22.

There is thus provided a jackeye and connector assembly which may be selectively interlocked to define an integral unit possessing the advantages of resiliency and flexibility in the jackeye with the relatively wear-resistant properties of the connector to prolong the useful life of the assembly. The ease and simplicity with which the connector may be removed from the jackeye is advantageous in enabling one to connect the dobby cords to the jackeye in any desired manner, either with or without leader wires.

In the drawings and specification there has been set forth a preferred embodiment of the invention wherein specific terms are employed in a descriptive sense but not for purposes of limitation, the scope of the invention being defined in the claims.

I claim:

1. In a jackeye and connector assembly, said jackeye having a pair of longitudinally extending side walls and first and second end walls defining an opening to loosely receive the jack lever of a dobby loom, said one end wall of the jackeye being engageable with a notched edge of the jack lever, said connector having a pair of spaced legs and a neck extending between corresponding ends of the legs, the neck of said connector being releasably engageable with the inner surface of said second end wall of the jackeye, a first means on said connector for preventing relative pivotal movement between the jackeye and the connector during use and a second means on said connector for connecting a harness frame of a dobby loom to the connector.

2. A jackeye and connector assembly according to claim 1 wherein said first-named means comprises shoulders extending over the side walls of the jackeye.

3. A jackeye and connector assembly according to claim 2 wherein the inner surface of said second end wall of the jackeye conforms to the configuration of the proximal surface of the neck of the connector when the jackeye and connector are in assembled relation.

4. A jackeye and connector assembly according to claim 1 wherein the neck portion is reduced in thickness relative to the corresponding dimension of the legs of the connector, and wherein the proximal portions of the side walls of the jackeye are thickened to snugly receive the reduced neck portion of the connector therebetween.

5. A connector for use with a loom jackeye having a pair of longitudinally extending side walls and first and second end walls defining an opening to loosely receive the jack lever of a dobby loom, said connector comprising a pair of spaced legs and a neck extending between corresponding ends of the legs, the neck of said connector being releasably engageable with the inner surface of one end wall of said jackeye, a first means on said connector for preventing relative pivotal movement between the jackeye and the connector during use and a second means on said connector for connecting a harness frame of a dobby loom to the connector.

6. A connector according to claim 5 wherein said first connecting means comprises a reduced dimension on said neck portion relative to the corresponding dimension of the legs of the connector, said legs being of such thickness as to extend over the side walls of a jackeye in assembled relation.

7. The connector according to claim 6 wherein the inner surface of the neck of the connector conforms to the configuration of the proximal surface of the end wall of the jackeye when the jackeye and connector are in assembled relation.

References Cited

UNITED STATES PATENTS

| | | | |
|---|---|---|---|
| 42,817 | 5/1864 | Carroll | 287—81 |
| 380,118 | 3/1888 | Hutchins | 139—84 |
| 996,193 | 6/1911 | Arienta | 139—83 X |
| 1,668,124 | 5/1928 | Pfeiffer | 139—88 |
| 2,429,794 | 10/1947 | Bergstrom et al. | 139—89 |
| 3,174,513 | 3/1965 | Wilkie | 139—84 |
| 3,262,469 | 7/1966 | Blakely | 139—84 |

MERVIN STEIN, *Primary Examiner.*

J. KEE CHI, *Assistant Examiner.*